United States Patent
Machek

[11] 3,881,779
[45] May 6, 1975

[54] BRAKE ANTI-LOCK MECHANISM

[75] Inventor: John A. Machek, Creve Coeur, Mo.

[73] Assignee: Wagner Electric Corporation, Parsippany, N.J.

[22] Filed: May 21, 1973

[21] Appl. No.: 362,018

Related U.S. Application Data

[63] Continuation-in-part of Ser. No. 218,293, Jan. 17, 1972, Pat. No. 3,758,167.

[52] U.S. Cl. .................................. 303/21 F; 303/40
[51] Int. Cl. .............................................. B60t 8/08
[58] Field of Search ............ 303/21 F, 21 C, 29, 40; 188/181 A; 137/596, 596.16

[56] References Cited
UNITED STATES PATENTS

| | | |
|---|---|---|
| 3,740,105 | 6/1973 | Holmes .............................. 303/21 F |
| 3,747,992 | 7/1973 | Schnipke ............................. 303/40 |
| 3,758,167 | 9/1973 | Machek............................ 303/21 F |
| 3,768,519 | 10/1973 | Morse............................ 303/21 F X |

Primary Examiner—Duane A. Reger
Assistant Examiner—Barry L. Kelmachter

[57] ABSTRACT

An electro-pneumatic control valve for use in a brake anti-lock system is provided with a relay portion for controlling fluid pressure applied to the system in response to predeterminately selected fluid pressure samples supplied thereto and an electric sampling device responsive to signals supplied thereto upon the occurrence of pre-selected conditions in the brake system for controlling the fluid pressure samples supplied to said relay portion.

4 Claims, 9 Drawing Figures

BRAKE ANTI-LOCK MECHANISM

CROSS-REFERENCE TO RELATED APPLICATION

This application is a continuation-in-part of my co-pending U.S. patent application Ser. No. 218,293, filed Jan. 17, 1972 now U.S. Pat. No. 3,758,167.

FIELD OF THE INVENTION

This invention relates generally to brake anti-lock systems and in particular to an electro-pneumatic control valve for use in such systems.

BACKGROUND OF THE INVENTION

In past anti-lock systems, various types of control valves were utilized to control the application of fluid pressure from a source thereof to at least some of the vehicle brakes of said brake system; however, one of the main undesirable or disadvantageous features of such past control valves was that they tended to overshoot in applying the pressure to the brake thereby driving the braked wheel to a locked condition. Another undesirable or disadvantageous feature of such past control valves was that such overshooting of the desired braking pressure which locked the vehicle wheel resulted in loss of vehicle steering stability and confused the system logic or electronics since the logic has difficulty in distinguishing between a stopped vehicle wheel and a locked vehicle wheel. Still another disadvantageous or undesirable feature of such past control valves was that they consumed or exhausted too much system pressure which burdened the make-up capabilities thereof. And yet another disadvantageous or undesirable feature of such past control valves was that they compared the instantaneous system pressure only with that which was applied immediately prior thereto.

The principle object of the present invention is to provide a control valve for a brake anti-lock system which overcomes the aforementioned disadvantageous or undesirable features of the past control valves, and this, as well as other objects and advantageous features of the present invention, will become apparent in the specification which follows.

SUMMARY OF THE INVENTION

Briefly, the present invention includes a control valve for a brake anti-lock system having relay means effecting the application to said system of supplied fluid pressure in response to control fluid pressure subjected thereto, and other means actuated in response to the occurrence of preselected conditions during a braking application for controlling the magnitude of said control fluid pressure acting on said relay means.

BRIEF DESCRIPTION OF THE DRAWINGS

In the drawings, which illustrate embodiments of the invention and wherein like numerals refer to like parts wherever they occur.

DETAILED DESCRIPTION OF THE INVENTION

Figure 1:
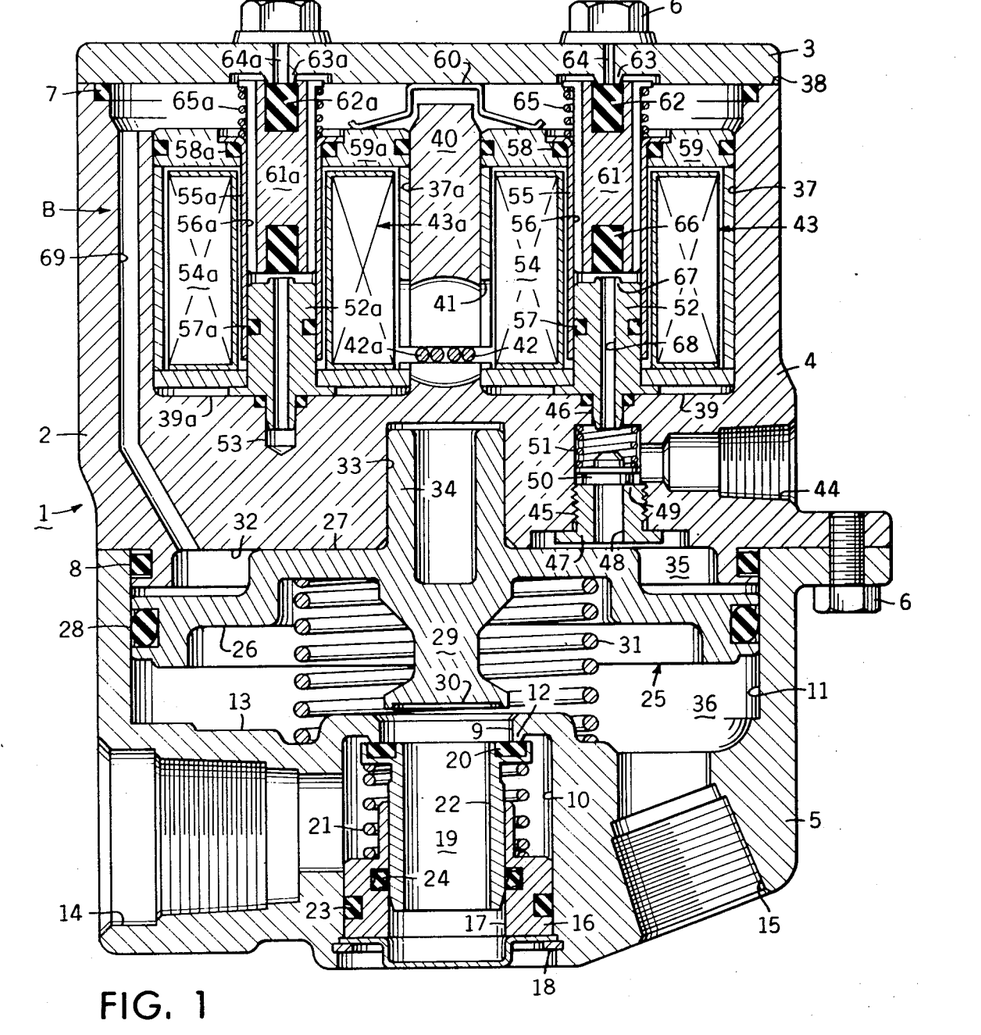
FIG. 1 is a sectional view showing a control valve embodying the present invention in cross-section.

Referring now to the drawing in detail, an anti-lock device or control valve 1 for a brake anti-lock system (not shown) is provided with a housing 2 having upper, intermediate and lower portions 3, 4, 5 which are interconnected by suitable means, such as the studs 6, and seals or O-ring members 7, 8 are sealably interposed between said upper and intermediate housing portions and said intermediate and lower housing portions, respectively.

The lower housing 5 is provided with a bore 9 interposed between opposed counterbores 10, 11, said counterbore 10 defining an inlet chamber, and opposed annular shoulders 12, 13 are provided on said housing at the intersections of said bore with said counterbores, respectively, said shoulder 12 defining a valve seat. An inlet port 14, which is adapted for connection with a fluid pressure source (not shown), is provided in the lower housing 5 intersecting with the counterbore 10, and an outlet port 15, which is adapted for connection with a vehicle brake (not shown), is also provided in said lower housing intersecting with the shoulder 13. A valve guide member 16 having a bore 17 therethrough is positioned in the lower end of the counterbore 10 against displacement by a groove and snap ring assembly 18, and a valve member 19 is slidably received in the guide bore 17 having a sealing head or portion 20 urged into sealing engagement with the valve seat 12 by the negligible force of a valve spring 21 interposed between said valve member and said guide isolating the inlet chamber 10. A bore or exhaust passage 22 is provided through the valve member 19 normally connecting the counterbore 11 to the atmosphere, and seals 23, 24 are carried in the guide member 16 in sealing engagement with the lower end of the counterbore 10 and said valve member, respectively. A relay member or piston 25 having opposed sides or faces 26, 27 is slidably received in the counterbore 11 carrying a peripheral seal or O-ring 28 in sealing engagement with said counterbore. An extension 29 is integrally formed with the piston 25 on the lower side 26 thereof having a free end portion 30 which defines a valve seat for engagement with the valve member 19 about the exhaust passage 22 thereof, as discussed hereinafter, and a return spring 31 is interposed between the relay piston side 26 and the housing shoulder 13 normally maintaining said valve seat 30 displaced from said valve member and urging the relay piston upper side 27 into abutment with the lower end or shoulder 32 of the intermediate housing 4 which closes the counterbore 11. The intermediate housing 4 is provided with a centrally located guide recess 33 therein which slidably and guidably receives another extension or guide 34 integrally formed with the relay piston upper side 27, and an expansible control or sampling chamber 35 is defined in the counterbore 11 between said relay piston upper face and said intermediate housing lower end in opposition to an outlet chamber 36 also defined in said counterbore between the relay piston lower face 26 and the housing shoulder 13.

The intermediate housing 4 is provided with companion solenoid chambers or bores 37, 37a intersecting with the upper end 38 of said intermediate housing and having base or end walls 39, 39a, and a wall 40 which is integral with said intermediate housing is provided between said solenoid chambers being cross-slotted at 41 to define a lead-out passage for the terminals 42, 42a of solenoids 43, 43a, as discussed hereinafter. A control or sampling port 44, which is adapted for connection with an operator controlled service foot or application valve of the brake system (not shown), is provided in the intermediate housing 4 intersecting with the larger of stepped vertical bores 45, 46, and said stepped bores intersect with the bore end wall 39 and intermediate housing lower end 32, respectively. An insert 47 is threadedly received in the lower end of the larger stepped bore 45 having a passage 48 therethrough connecting between the sampling chamber 35 and inlet port 44, and a valve seat 49 is provided on said insert about said passage for engagement with a uni-directional valve member or check valve 50 which is normally urged thereinto by the negligible force of a valve spring 51 biased between said check valve and the intermediate housing 4.

Solenoids 43, 43a are provided with pole pieces 52, 52a which extend coaxially into the solenoid chambers 37, 37a, and the pole piece 52 is seated in abutting engagement with the solenoid chamber end wall 39 extending into the smaller stepped bore 46 in supporting and guiding engagement therewith while the pole piece 522 is seated in abuting engagement with the solenoid chamber end wall 39a and extends into a recess 53 provided in the intermediate housing 4 in supporting and guiding engagement therewith. Annular cylindrical electrical coils 54, 54a of the solenoids 43, 43a are positioned in the solenoid chambers 37, 37a and supported on the pole pieces 52, 52a, and the terminal or leads 42, 42a of said coils are lead out of the intermediate housing 4 through the lead-out slots 41 for connection with the logic or electronic portion of the brake anti-lock system (not shown). Tubular or sleeve members 55, 55a having bores 56, 56a therethrough extend coaxially through the coils 54, 54a in sealing engagement with seals 57, 57a and 58, 58a respectively carried in the pole pieces 52, 52a and coil retainers 59, 59a which are retained in displacement preventing engagement with the upper end of said coils by a clip spring 60 biased between the housing cover 3 and said retainers.

Figure 2:
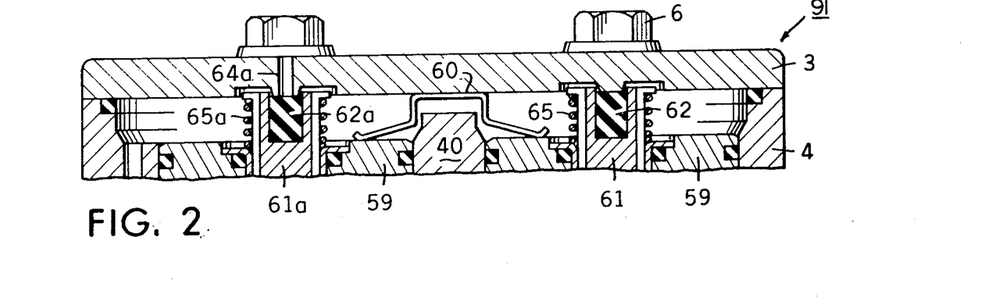
FIG. 2 is a partial sectional view illustrating another control valve embodying the present invention in cross-section.

Hexagonally shaped armature members 61, 61a of the solenoids 43, 43a are reciprocally received in the sleeve member bores 56, 56a having exhaust valve members 62, 62a in the upper ends thereof normally urged into sealing engagement with exhaust valve seats 63, 63a provided on the cover housing 3 about exhaust passages 64, 64a therein by the negligible force of return springs 65, 65a biased between said armature members and the retainers, respectively. In the preferred embodiment, it should be noted that the exhaust passage 64 is appreciably smaller than the exhaust passage 64a to restrict the relative rates of exhausting fluid pressure flow, as discussed hereinafter; however, it is apparent that exhaust passages 64, 64a can be of substantially equal size, if desired. The relative sizes of the exhaust passages 64, 64a depend, or are correlated with, the volumetric characteristics of the brake system (not shown), and if the volume of the brake system is relatively small, the exhaust passage 64 can be omitted, as shown in FIG. 2. Another valve member 66 is carried in the lower end of the armature 61 and normally displaced from sealing engagement with a valve seat 67 provided on the upper end of the pole piece 52 about a passage or bore 68 therethrough connecting the larger stepped bore 45 with the sleeve member bore 56. To complete the description of the control valve 1, another passage 69 is provided in the intermediate housing 4 connected between the sampling chamber 35 and the solenoid chambers 37, 37a above the retainers 59, 59a therein, and it is apparent that a restricted or tortuous flow passage means, indicated generally at B, is defined between the inlet port 44 and said sampling chambers by the larger stepped bore 45, the pole piece passage 68, the sleeve member bore 56, the portions of the solenoid chambers 37, 37a above the retainers 59, 59a therein, and the passage 69; however, while the restriction of the flow passage B is provided between the various components defining such, it is contemplated that said flow passage can also be restricted by various permanent or adjustable flow throttling or restricting devices such as orifices, vortexes, needle valves, or the like which are well known in the art.

OPERATION

With the component parts of the control valve 1 positioned as shown in the drawing and as described, if the vehicle operator desires to effect a service brake application or brake energization to decelerate the vehicle, a control or sampling fluid pressure is supplied to the control port 44 upon operator actuation of an application or foot valve of a type well known in the art (not shown). The control fluid pressure flows from the control port 44 through the flow passage B to the control chamber 35 acting on the effective area of the relay piston 25 therein to create a control force Fc urging said relay piston downwardly against its return spring 31. This downward movement initially engages the relay piston valve seat 30 with the valve member 19 closing the exhaust passage 22 thereof and isolating the outlet chamber 36 from the atmosphere, and said downward movement thereafter urges said valve member against its valve spring 21 to a position disengaged from the housing valve seat 12 to establish pressure fluid communication between the inlet and outlet ports 14, 15. Supplied or input fluid pressure flows from its source (not shown) through the inlet port 14, the inlet chamber 10, the outlet chamber 36 to establish an output or applied fluid pressure at the outlet port 15 which is, of course, effective to energize the vehicle brakes (not shown) connected therewith and decelerate the vehicle.

When the reaction force Fr created by the established output fluid pressure in the output chamber 36 acting on the effective area of the relay piston 25 therein substantially equals the control force Fc, said relay piston is moved upwardly toward a lapped position, and said valve member follows toward the lapped position in lapped engagement between the relay piston valve seat 30 and the housing valve seat 12. If a greater braking application is desired to increase the intensity of brake energization and vehicle deceleration, the magnitude of the control fluid pressure is increased which results in an increased control force Fc to further actuate the relay piston 25 and valve member 19, as previously described, toward their lapped positions effecting a corresponding increase in the magnitude of the output fluid pressure.

If the desired braking effort or brake energization is attained without engendering a wheel lock-up or vehicle skid condition and the operator de-actuates the foot valve to exhaust the control fluid pressure at the control port 44 to the atmosphere, a fluid pressure differential is, of course, established across the unidirectional valve 50 between the control fluid pressure in the control chamber 35 and that exhausting to atmosphere through the control port 44, and said uni-directional valve is movable against its return spring 51 in response to said fluid pressure differential acting thereacross toward a position displaced from the insert valve seat 49 to open the insert passage 48 thereby effecting the exhausting flow of the control fluid pressure from the control chamber 35 through said insert passage and the housing larger stepped bore 45 directly to said control port which, in effect, "short-circuits" or by-passes the restricted flow passage means B to effect very rapid exhaustion of the control fluid pressure. Upon such rapid exhaustion of the control fluid pressure from the control chamber 35, the reaction force Fr and the return spring 31 urges the relay piston 25 upwardly toward its original position in engagement with the intermediate housing abutment 27 disengaging the valve seat 30 from the valve member 19 to again open the valve member exhaust passage 22 reestablishing exhausting communication between the outlet port and chamber 15, 36 and the atmosphere. In this manner, the output fluid pressure is exhausted from the brakes to effect de-energization thereof through the outlet port and chamber 15, 36 and the valve member exhaust passage 22 to the atmosphere, and upon such exhaustion of the output fluid pressure, the reaction force Fr is, of course, eliminated.

If the output fluid pressure applied to energize the vehicle brakes during the above-described brake application is of a magnitude great enough to effect a wheel lock-up or vehicle skid condition, the brake anti-lock system logic and sensor portions (not shown) ascertains such wheel lock-up and signals the control valve 1 indicating, in effect, that the magnitude of the output fluid pressure should be reduced. The logic signal excites or energizes the coil 54 of the solenoid 43 creating a magnetic force which moves the armature 61 downwardly against its return spring 65 into magnetic holding engagement with the pole piece 52, and in this manner, the armature valve member 66 is engaged with the pole piece valve seat 67 to close the pole piece passage 68 isolating the control port 44 while the armature exhaust valve member 62 is disengaged from the upper housing exhaust valve seat 63 to open the restricted exhaust passage 64. With the control port 44 isolated and the exhaust passage 64 so opened, a restricted exhausting flow of control fluid pressure is effected from the control chamber 35 through the passage 69, the portion of the solenoid chambers 37, 37a above the solenoid retainers 59, 59a, and the open exhaust passage 64 to the atmosphere thereby rather slowly reducing the magnitude of the control fluid pressure in said control chamber to correspondingly reduce the magnitude of the control force Fc. Since the control fluid pressure is being exhausted to effect a continuous reduction of the control force Fc, the reaction force Fr urges the relay piston 25 upwardly from its lapped position to displace the valve seat 30 thereof from the valve member 19 thereby opening the valve member exhaust passage 22 and exhausting the output fluid pressure from the vehicle brakes to the atmosphere. Of course, it is apparent that such restricted exhausting flow of the control fluid pressure from the control chamber 35 effects a corresponding reduction of the output fluid pressure applied at the outlet port 15 and to the vehicle brake to also effect a corresponding reduction of the intensity of the brake energization.

If the aforementioned reduction of the intensity of the brake energization does not alleviate the wheel lock-up or vehicle skid condition, the sensor and logic portions of the brake system discern such and again signal the control valve 1 that such wheel lock-up is continuing indicating, in effect, that the output fluid pressure should be further reduced. This additional logic signal energizes the coil 54a of the solenoid 43a creating a magnetic force which moves the armature 61a downwardly against the return spring 65a into magnetic holding engagement with the pole piece 52a, and in this manner, the armature valve member 62a is displaced from the upper housing exhaust valve seat 63a to also open the exhaust passage 64a. With both the exhaust passages 64, 64a open and the control port 44 isolated, it is apparent that the control fluid pressure is now exhausted from the control chamber 35 at a more rapid rate providing a more rapid exhaustion of the outlet fluid pressure in the same manner as discussed hereinbefore which, of course, effects a corresponding reduction of the intensity of the energization of the vehicle brakes and a rather rapid alleviation of the wheel lock-up or skid condition.

When the sensor and logic portions of the brake system determine that the wheel lock-up condition has been alleviated, the signals to the solenoids 43, 43a of the control valve 1 are terminated which de-energizes the solenoid coils 54, 54a and eliminates the attractive magnetic force between the pole pieces 52, 52a and armatures 61, 61a, respectively. Upon the elimination of the magnetic force, the return springs 65, 65a move the armatures 61, 61a upwardly toward their original positions re-engaging the exhaust valve members 62, 62a with the upper housing valve seats 63, 63a closing the exhaust passages 64, 64a, respectively, and of course, the movement of the armature 61 to its original position also disengages the valve member 66 thereof from the pole piece valve seat 67 to open the pole piece passage 68 and re-establish pressure fluid communication through the flow passage B between the control port 44 and the control chamber 35.

When communication between the control port 44 and the control chamber 35 is re-established, the relay piston 25 and valve member 19 are again actuated to increase the magnitude of the output fluid pressure applied to the outlet port 15 and the vehicle brakes to effect a corresponding increase in the energization thereof, and if such increased brake energization again effects a wheel lock-up condition, the brake anti-lock system re-cycles wherein the sensor and logic portions thereof again signal the control valve 1 to reduce the output fluid pressure in the same manner as previously described. Of course, the brake anti-lock system and control valve 1 continue such re-cycling to alleviate the occurrence of wheel lock-up conditions until the desired vehicle deceleration is attained.

Referring now to FIG. 2, another anti-lock device or control valve 91 is shown functioning in substantially the same manner and having substantially the same component parts as the previously described control valve 1 with the exception that only the exhaust passage 64a is provided in the upper housing portion 3 of the control valve since, as previously mentioned, the control valve is contemplated for use in anti-lock brake systems having a comparatively small volumetric capacity.

In the operation of the control valve 91, the relay piston 25 is actuated in response to control fluid pressure applied to the control port and chamber 44, 35 to effect a corresponding output fluid pressure at the outlet port 15 for energizing the vehicle brakes, and if such brake energization results in a wheel lock-up condition, the sensor and logic portion effects a signal to energize the solenoid 43 and move the armature valve member 66 into engagement with the pole piece valve seat 67 closing the passage 68 to isolate said control port, as previously described. If the wheel lock-up continues, the sensor and logic portion effects the additional signal to energize the solenoid 43a and move the armature 61a into magnetic holding engagement with the pole piece 52a displacing the armature valve member 62a from the upper housing exhaust valve seat 63a to open the exhaust passage 64a, and the exhausting flow of control fluid pressure is thereby effected at a rather rapid rate from the control chamber 35 through the passage 69 and the open exhaust passage 64a to the atmosphere. When the control force Fc is so reduced, the reaction force Fr urges the relay piston 25 upwardly from its lapped position to disengage the valve seat 30 thereof from the valve member 19 to open its exhaust passage 22 and exhaust to the atmosphere the output fluid pressure applied to the brakes to reduce the intensity of the energization thereof. Upon alleviation of the wheel lock-up condition in response to the reduction of the intensity of the brake energization, the logic and sensor portions terminate the signals to the control valve 91 de-energizing the solenoids 43, 43a, and the armature return springs 65, 65a return the armatures 61, 61a to their original positions re-establishing pressure fluid communication between the control port and chamber 44, 35 through the flow passage B and re-engaging the valve member 62a with its valve seat 63a to close the exhaust passage 64a.

When pressure fluid communication is re-established between the control port and chamber 44, 35, the control force Fc again actuates the relay piston 25 and valve member 19 to re-establish or increase the output fluid pressure applied to the outlet port 15 and the vehicle brake to effect a corresponding increase in the energization thereof, and if such brake energization again results in a wheel lock-up condition, the brake anti-lock system recycles wherein the sensor and logic portions again signal the control valve 91 to reduce the output fluid pressure, as previously described. Of course, the brake anti-lock system and control valve 91 continues such re-cycling to alleviate the occurrence of wheel lock-up conditions until the desired vehicle deceleration is attained.

Figure 3:
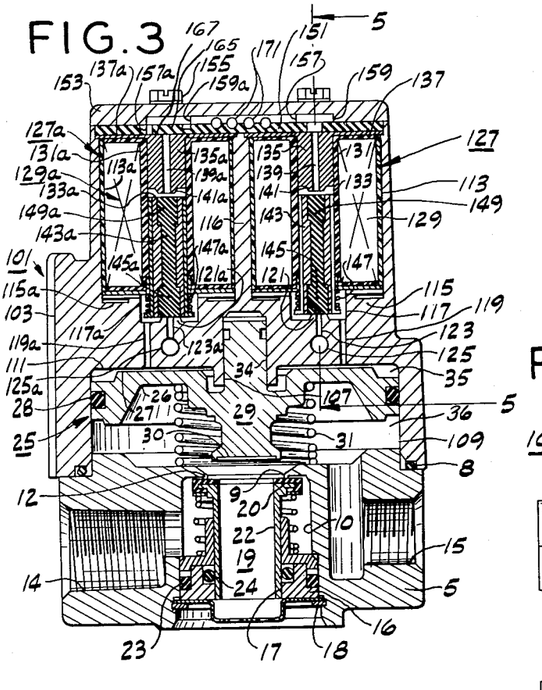
FIG. 3 is a sectional view showing another control valve of the invention.
Figure 4:
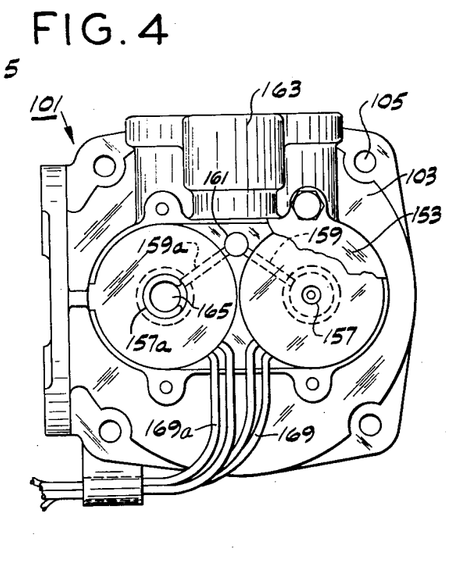
FIG. 4 is a plan view of the control valve of FIG. 3 partially broken away.
Figure 5:
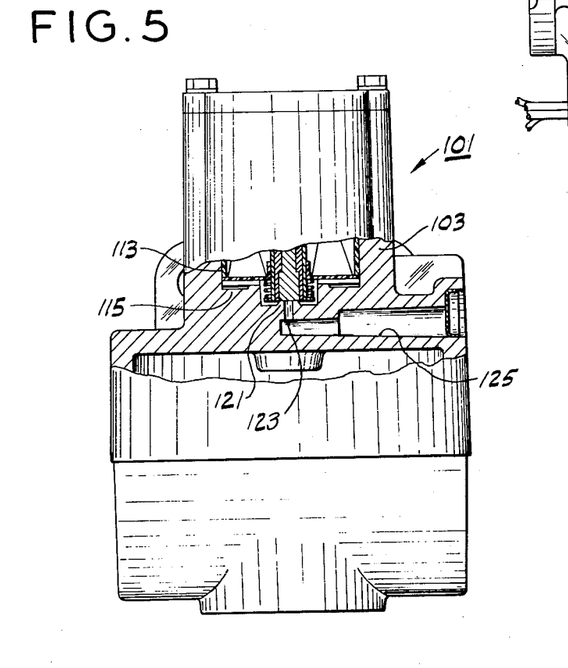
FIG. 5 is a fragmentary sectional view taken on line 5—5 of FIG. 3.
Figure 6:
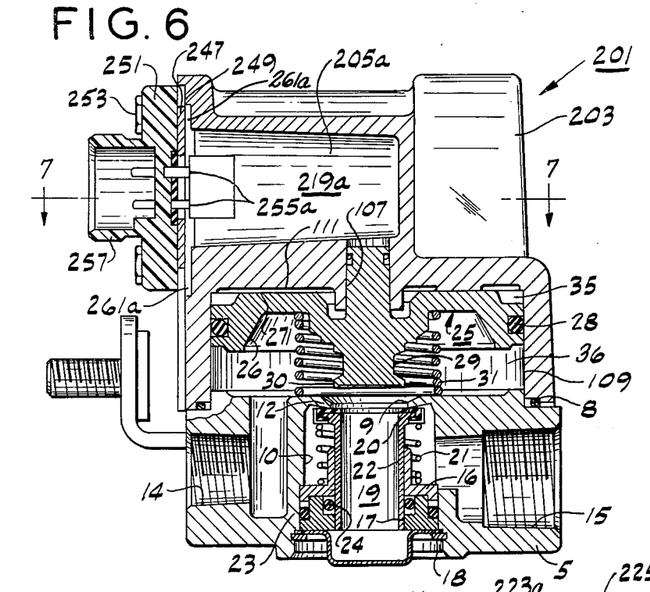
FIG. 6 is a sectional view showing another control valve of the invention.
Figures 7, 8, 9:
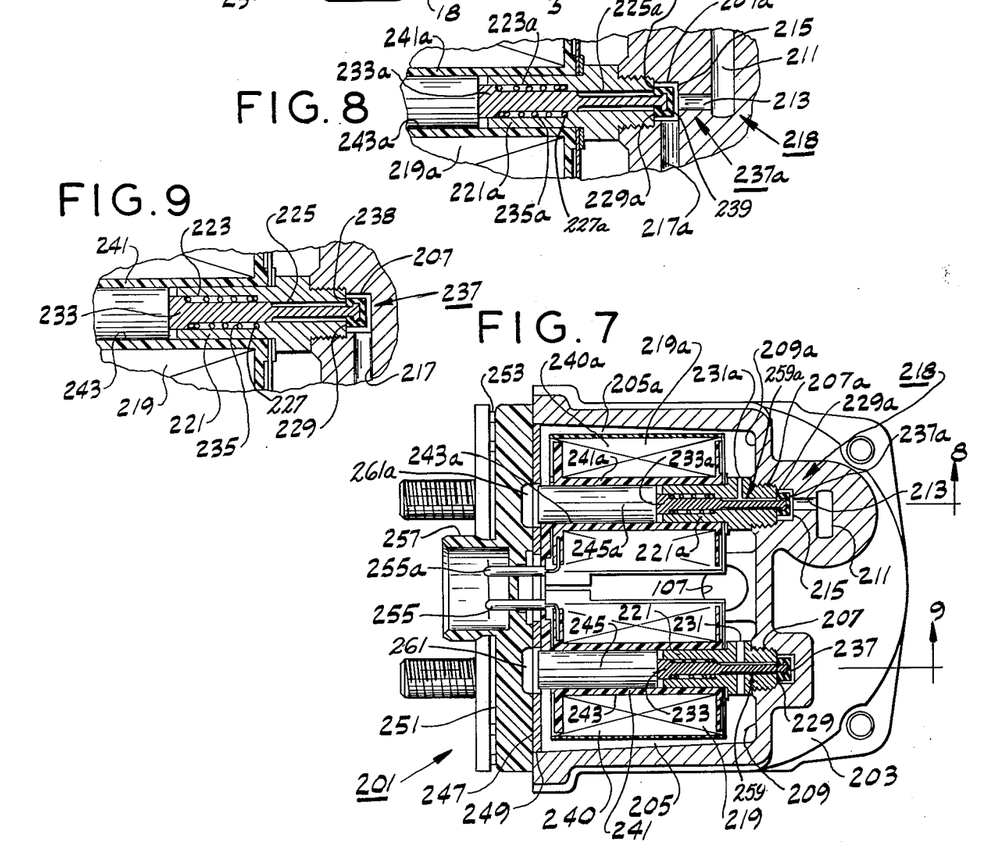
FIG. 7 is a sectional view taken on line 7—7 of FIG. 6.
FIG. 8 is a sectional view taken on line 8—8 of FIG. 7.
FIG. 9 is a sectional view taken on line 9—9 of FIG. 7.

Referring now to FIGS. 3, 4 and 5, another anti-lock device control valve 101 is provided having substantially the same component parts and functioning substantially in the same manner as the previously described control valve 1 with the following exceptions.

Control valve 101 is provided with an intermediate housing 103 which is fixedly engaged with lower housing 5 by suitable means, such as studs 105, and seal 8 is sealably disposed between housings 5 and 103. A bore 107 and counterbore 109 are provided in housing 103 having shoulder 111 therebetween, and relay piston 25 and its extension 34 are slidable in the counterbore and bore. Expansible control or sampling chamber 35 is defined in counterbore 109 between housing shoulder 111 and upper piston face 27.

Intermediate housing 103 is provided with companion, side-by-side solenoid chambers or bores 113, 113a intersecting with the upper end of the intermediate housing and having base or lower end walls 115, 115a. A wall 116 is integral with intermediate housing 103 and provided between solenoid chambers 113, 113a. Recesses 117, 117a are provided in housing 103 coaxially with solenoid chamber base walls 115, 115a, and passages 119, 119a connect between the control chamber 35 and the recesses. Valve seats 121, 121a are provided on the end walls of recesses 117, 117a about restricted vertically extending passages 123, 123a which intersect with horizontally extending passages 125, 125a thereby to constitute exhaust passages for control valve 101.

Solenoids 127, 127a are provided with generally annular cylindric electrical coils 129, 129a which are disposed in solenoid chambers 113, 113a and seated on the lower end wall 115, 115a thereof. Tubular or sleeve members 131, 131a having bores 133, 133a therethrough extend coaxially through coils 129, 129a in sealing engagement therewith, and pole pieces 135, 135a extend into the sleeve bores from the upper end thereof and in sealing engagement therewith. Pole pieces 135, 135a are integrally provided with rather thin and radially extending flanges 137, 137a which cover the upper end of solenoid coils 129, 129a, and axial passages 139, 139a are provided through the pole pieces intersecting at the lower end of the pole pieces with valve seats 141, 141a provided thereon. Hexagonally shaped armatures 143, 143a are reciprocally received in the sleeve bores 133, 133a having exhaust valves 145, 145a in the lower ends thereof normally urged into sealing engagement with exhaust valve seats 121, 121a by the negligible forces of return springs 147, 147a biased between solenoid coils 129, 129a and the armatures. Other valves 149, 149a are carried on the upper end of armatures 143, 143a and normally displaced from sealing engagement with the pole-piece valve seats 141, 141a.

A generally flat resilient gasket 151 is disposed across the upper end of solenoid chambers 127, 127a and intermediate housing 103, and the gasket is clamped between the upper end of the intermediate housing and an upper housing or cover 153 fixedly engaged therewith by a plurality of studs 155. Openings 157, 157a are provided through gasket 151 in communication with pole piece passages 139, 139a and a pair of branch passages 159, 159a provided in cover 153 and on top of gasket 151. Branch passages 159, 159a each connect with one end of a vertical passage 161 provided in the intermediate housing 103, and the other end of the vertical passage intersects with a control or service port 163 which is adapted to be connected with an operator-controlled service foot or application valve of the brake system (not shown). A uni-directional check or flapper type valve 165 is integrally formed with gasket 151 and is normally biased into seating engagement with a valve seat 167 provided on pole piece 135a about the upper end of its passage 139a, thereby to prevent fluid pressure flow from branch passage 159a to the pole piece passage 139a. Leads 169, 169a of the solenoid coils 129, 129a extend through gasket 151, and lead-out passages 171 are provided in cover 153 through which the solenoid coil leads extend.

With the component parts of the control valve 101 positioned as shown in the drawings and as described, if the vehicle operator desires to effect a service brake application or brake energization to decelerate the vehicle, a control or sampling fluid pressure is supplied to control port 163 upon operator actuation of an application or foot valve of a type well known in the art (not shown). The control fluid pressure flows from the control port 163 through vertical passage 161, branch passage 159, pole piece passage 139, sleeve bore 133, housing recess 117, and housing passage 119 into control chamber 35 creating the control force Fc urging relay piston 25 downwardly against its return spring 31. This downward movement of relay piston 25 actuates valve member 19 to its positioned disengaged from housing valve seat 12 to establish an output or applied fluid pressure at the outlet port 15 which is, of course, effective to energize the vehicle brakes (not shown) connected therewith and decelerate the vehicle as previously described. When the reaction force Fr created by the established output fluid pressure in the outlet chamber 36 acting on the effective area of relay piston 25 therein substantially equals the control force Fc, valve member 19 and relay piston 25 are conjointly moved upwardly to their lapped positions, as previously described.

If the desired braking effort or brake energization is attained without engendering a wheel lock-up or vehicle-skid condition and the operator deactuates the foot valve (not shown) to exhaust the control fluid pressure at control port 163 to atmosphere, a fluid pressure differential is established across gasket check valve 165 thereby to permit exhausting flow of control fluid pressure from control chamber 35 through the housing passages 119, 119a, recesses 117, 117a, sleeve bores 133, 133a, pole piece passages 139, 139a, branch passages 159, 159a, and vertical passage 161 to control port 163. In this manner, opening of check valve 165 permits rapid exhausting of the control fluid pressure from control chamber 35, and reaction force Fr and return spring 31 urge relay piston 25 upwardly toward its original position in engagement with the housing abutment 111 thereby to exhaust the output fluid pressure from outlet chamber 36 and the brakes to effect deenergization thereof as previously described. Upon exhaustion of the outlet fluid pressure, the reaction force Fr is eliminated.

If the output fluid pressure applied to energize the vehicle brakes during the above-described brake application is of a magnitude great enough to effect a wheel lock-up or vehicle-skid condition, the brake anti-lock system logic and sensor portions (not shown) ascertain such wheel lock-up and signal the control valve 101 indicating, in effect, that the magnitude of the output fluid pressure should be reduced. The logic signal excites or energizes coil 129 of solenoid 127 creating a magnetic force which moves armature 143 upwardly against its return spring 147 into magnetic holding engagement with pole piece 135, and armature valve 149 is engaged with the pole piece valve seat 141 to close pole piece passage 139 isolating the control port 163 while armature exhaust valve member 145 is disengaged from the housing exhaust valve seat 121 to open the restricted exhaust passage 123, 125. With control port 163 isolated and exhaust passage 123, 125 so opened, a restricted exhausting flow of control fluid pressure is effected from control chamber 35 through housing passage 119, recess 117 and the opened exhaust passage 123, 125 to atmosphere, thereby controllably and rather slowly reducing the magnitude of the control fluid pressure in control chamber 35 and correspondingly reducing the magnitude of control force Fc. Since the control fluid pressure is being exhausted to effect a continuous reduction of the control force Fc, reaction force Fr urges relay piston 25 upwardly from its lapped position opening valve member exhaust passage 22 and exhausting the output fluid pressure from the vehicle brakes to atmosphere. It is apparent that the controlled and restricted exhaustion of the control fluid pressure from control chamber 35 effects a corresponding reduction of the output fluid pressure applied at the outlet port 15 and to the vehicle brakes to also effect a corresponding reduction of the intensity of the brake energization.

If the aforementioned controlled reduction of the intensity of brake energization does not alleviate the wheel lock-up or vehicle-skid conditions, the sensor and logic portions of the anti-lock brake system discern such and again signal control valve 101 that such wheel lock-up is continuing, indicated that the output fluid pressure should be further reduced. This additional logic signal energizes coil 129a of solenoid 127a creating a magnetic force which moves armature 143a upwardly against its return spring 147a into magnetic holding engagement with pole piece 135a, and in this manner, armature valve 145a is displaced from the housing valve seat 121a to also open the exhaust passage 123a, 125a. With both exhaust passages 123, 125 and 123a, 125a open and control port 163 isolated, it is apparent that isolated control fluid pressure is now exhausted from control chamber 35 at a predeterminately greater rate which also provides for a more rapid exhaustion of the output fluid pressure, as discussed hereinbefore, thereby to effect a corresponding reduction of the intensity of vehicle brake energization and a rather rapid elimination of the wheel lock-up or skid condition.

When the sensor and logic portions of the anti-lock brake system determine that the wheel lock-up condition has been eliminated, the electrical signals to solenoids 127, 127a are terminated which deenergizes coils 129, 129a and eliminates the attractive magnetic forces between pole pieces 135, 135a and armatures 143, 143a. Return springs 117, 117a now move deenergized armatures 143, 143a downwardly to their original positions reengaging exhaust valves 145, 145a with housing valve seats 121, 121a to close exhaust passages 123, 125 and 123a, 125a, and the movement of the armatures to their original positions also disengages the valves 149, 149a thereof from pole piece valve seats 141, 141a thereby to reestablish pressure fluid communication between control port 163 and control chamber 35. upon the establishment of communication between control port 163 and control chamber 35, relay piston 25 and valve member 19 are again actuated to increase the magnitude of the outlet fluid pressure applied to outlet port 15 and the vehicle brakes thereby to effect a corresponding increase in the energization thereof. If such increased brake energization again effects a wheel lock-up condition, the anti-lock brake system recycles wherein the sensor and logic portions thereof again signal control valve 101 to reduce the output fluid pressure in the same manner as previously described. Of course, the anti-lock brake system and control valve 101 continue to cycle to eliminate the occurrence of wheel lock-up conditions until the desired vehicle deceleration is attained.

Referring now to FIGS. 6–9, another anti-lock device or control valve 201 is shown functioning in substantially the same manner and having substantially the same component parts as the previously described control valves 1, 101 with the following exceptions.

The control valve 201 is provided with an upper housing 203 having horizontally extending, companion solenoid chambers or bores 205, 205a and threaded recesses 207, 207a are provided communicating with inward or rightward shoulders or end walls 209, 209a of the solenoid chambers. A control port 211, which is adapted for connection with an operator-controlled service foot or application valve of an anti-lock brake system (not shown), is provided in upper housing 203, and a generally horizontal connecting passage 213 is provided between control port 211 and the end wall of recess 207 about the connecting passage defines a valve seat 215. Vertical passages 217, 217a provided in housing 203 have one of their ends intersecting with the side walls of recesses 207, 207a while the other ends of the vertical passages intersect with the control chamber 35. Connecting passage 213, vertical passage 217a and recess 207a constitute a flow passage 218 for control fluid pressure between control port 211 and control chamber 35. Electric solenoids 219, 219a are provided with pole pieces 221, 221a which are threadedly engaged with recesses 207, 207a and extend therefrom generally coaxially into solenoid chambers 205, 205a. Pole pieces 221, 221a are provided with stepped passages 223, 225 and 223a, 225a extending therethrough, and shoulders 227, 227a are formed on the pole pieces between the stepped passages. Exhaust valve seats 229, 229a are provided on the rightward ends of pole pieces 221, 221a within recesses 207, 207a and cross passages 231, 231a intersect the smaller stepped passages 225, 225a adjacent the mid portion thereof. Stepped valve stems 233, 233a are slidably received in pole piece stepped passages 223, 225 and 223a, 225a, and valve springs 235, 235a are biased between pole pieces 221, 221a and the stepped valve stems urging them leftwardly in the pole piece stepped passages. A pair of valve members 237, 237a are disposed on the rightward end of valve stems 233, 233a within recesses 207, 207a, and said valve members are provided with valve means or faces 238, 238a which are urged toward sealing engagement with exhaust valve seats 229, 229a. Valve member 237a is also provided with another valve means or face 239 opposite to valve means 238a for engagement with valve seat 215 about flow passage 218. Annular cylindric electrical coils 240, 240a of solenoids 219, 219a are disposed in solenoid chambers 205, 205a and supported on pole pieces 221, 221a. Tubular or sleeve members 241, 241a having bores 243, 243a therethrough extend coaxially through coils 240, 240a, and the leftward ends of pole pieces 221, 221a are received within the sleeve member bores.

Armature members 245, 245a of solenoids 219, 219a are reciprocally received in sleeve member bores 243, 243a, and the inward or rightward end of the armatures are respectively engaged with stepped valve stems 233, 233a which extend into the sleeve bores. A flux plate 247 is received in a recess 249 provided therefor in upper housing 203 adjacent the leftward end of solenoid chambers 205, 205a, and a nonconductive closure member 251 positions flux plate 247 in recess 249 against displacement, said closure being secured to housing 203 by suitable means, such as the studs 253. Solenoid leads 255, 255a extend through flux plate 247 and a portion of closure member 251 which forms a socket 257 into which the leads extend. Exhaust passages indicated generally at 259, 259a are defined by the smaller stepped passages 225, 225a and cross passages 231, 231a in pole pieces 221, 221a, solenoid chambers 205, 205a, and exhaust ports or grooves 261, 261a provided in the leftward ends of housing 203 which connect with the solenoid chambers and extend below flux plate 247 and closure member 251 thereby to connect the solenoid chambers with the atmosphere.

With the component parts of control valve 201 positioned as shown in the drawings and as described, if the vehicle operator desires to effect a service brake application or brake energization to decelerate the vehicle, control or sampling fluid pressure is supplied to control port 211 upon operator actuation of an application or foot valve of a type well known in the art (not shown). The control fluid pressure flows from control port 211 through connecting passage 213, recess 207a, and vertical passage 217a into control chamber 35 acting on the effective area of the relay piston 25 therein to create a control force Fc urging relay piston 25 downwardly against its return spring 31. This downward movement of relay piston 25 actuates valve member 19 to its position disengaged from housing valve seat 12 to establish the output or applied fluid pressure at outlet port 15 which is effective to energize the vehicle brakes (not shown) connected therewith and decelerate the vehicle, as previously described. When the reaction force Fr created by the established fluid pressure in outlet chamber 36 acting on the effective area of relay piston 25 substantially equals control force Fc, relay piston 25 and valve member 19 are conjointly moved toward their lapped positions; and if a greater braking application is desired to increase the intensity of brake energization and vehicle deceleration, the magnitude of the control fluid pressure is increased which results in an increased control force Fc to further actuate the relay piston and valve member, as previously described.

If the desired braking effort or brake energization is attained without engendering a wheel lock-up or vehicle-skid condition and the operator deactuates the foot valve (not shown) to exhaust the control fluid pressure at control port 211 to atmosphere, the control fluid pressure flows from control chamber 35 through vertical passage 217a, recess 207a, horizontal connecting passage 213, and the control port to atmosphere. Upon the exhaustion of the control fluid pressure from the control chamber 35, the reaction force Fr and return spring 31 urge relay piston 25 upwardly to its original position in engagement with housing abutment 111 thereby to exhaust the outlet fluid pressure from outlet chamber 36 and the brakes to effect de-energization thereof, as previously described. Upon exhaustion of the outlet fluid pressure, reaction force Fr is eliminated.

If the output fluid pressure applied to energize the vehicle brakes during the above-described brake application is of a magnitude great enough to effect a minor wheel lock-up or vehicle-skid condition, the brake antilock system logic and sensor portions (not shown) ascertain such wheel lock-up and signal control valve 201 indicating that the magnitude of the output fluid pressure should be reduced. The logic signal excites or energizes coil 240a of solenoid 219a creating a magnetic force which moves armature 245a rightwardly against the force of valve spring 235a into magnetic holding engagement with pole piece 221a, and rightward movement of the armature conjointly drives valve stem 233a rightwardly to move valve member 237a toward a position disengaging valve means 238a from exhaust valve seat 229a and engaging valve means 239 with valve seat 215 thereby to isolate control port 211 from control chamber 35 while also venting the isolated control fluid pressure in the control chamber through the exhaust passage 259a to atmosphere. Upon venting of the isolated control fluid pressure to atmosphere, the magnitude of control force Fc is correspondingly reduced, and reaction force Fr urges relay piston 25 upwardly from its lapped position to displace valve seat 30 thereof from valve member 19 thereby to open the valve member exhaust passage 22 and exhaust the output fluid pressure from the vehicle brakes to atmosphere. In this manner, the exhausting flow of isolated control fluid pressure from control chamber 35 effects a corresponding reduction of the output fluid pressure applied at output port 15 and to the vehicle brakes to also effect a corresponding reduction of the intensity of brake energization.

If the aforementioned controlled reduction of the intensity of braking energization does not eliminate wheel lock-up or vehicle-skid condition, the sensor and logic portions of the anti-lock brake system discern such and again signal control valve 201 that such wheel lock-up is continuing indicating that the output fluid pressure should be further reduced. This additional logic signal energizes coil 240 of solenoid 205 creating a magnetic force which move armature 245 rightwardly into magnetic holding engagement with pole piece 221, and at the same time, the rightward movement of the armature drives valve stem 233 rightwardly against valve spring 235 to a position wherein valve means 238 of valve member 237 is disengaged from exhaust valve seat 229. The movement of valve means 238 to its position disengaged from exhaust valve seat 229 opens exhaust passage 259. With both exhaust passages 259, 259a now open and control port 211 isolated, it is apparent that control fluid pressure is now exhausted from the control chamber 35 at a predeterminately greater rate which also provides for a more rapid exhaustion of outlet fluid pressure, as discussed hereinbefore, thereby to effect a corresponding reduction of the intensity of vehicle brake energization and a rather rapid elimination of the wheel lock-up or skid condition.

When the sensor and logic portions of the anti-lock brake system determine that the wheel lock-up condition has been eliminated, the signals to solenoids 205, 205a of control valve 201 are terminated which deenergizes coils 240, 240a and eliminates the attracting magnetic force between pole pieces 221, 221a and armatures 245, 245a. Upon the elimination of the magnetic forces, valve springs 235, 235a move armatures 245, 245a and valve stems 233, 233a leftwardly toward their original positions thereby to re-engage exhaust valve means 238, 238a with exhaust valve seats 229, 229a thereby to close exhaust passages 259, 259a. This leftward movement of valve stem 233a to its original position also effects the disengagement of valve means 239 from housing valve seat 215 thereby to open horizontal passage 213 and reestablish pressure fluid communication through the horizontal passage and vertical passage 217a between control port 211 and control chamber 35.

When communication between control port 211 and control chamber 35 is reestablished, relay piston 25 and valve member 19 are again actuated to increase the magnitude of the output fluid pressure applied to output port 15 and the vehicle's brakes to effect a corresponding increase in the energization thereof; and if such increased brake energization again effects a wheel lock-up condition, the brake anti-lock system recycles wherein the sensor and logic portions thereof again signal the control valve 201 to once more reduce the output fluid pressure in the same manner as previously described. Of course the brake anti-lock system and control valve 201 continue such recycling to eliminate the occurrence of wheel lock-up conditions until the desired vehicle deceleration is attained.

From the foregoing, it is now apparent that novel anti-lock devices 1, 91, 101 and 201 meeting the objects and advantageous features as set forth hereinbefore, as well as others, are provided and that changes as to the precise configurations, shapes and details of the constructions set forth in the disclosure by way of illustration may be made by those skilled in the art without departing from the spirit of the invention.

What is claimed is:

1. A control valve for an anti-lock brake system comprising:
 a housing;
 relay means movable in the housing and operable generally in response to control fluid pressure subjected thereto to effect a metered application through the housing of fluid pressure supplied thereto;
 means for controlling the control fluid pressure subjected to the relay means comprising an electric solenoid valve energized in response to a preselected condition to isolate the control fluid pressure acting on the relay means and vent the isolated control fluid pressure, the relay means being responsive to the reduction of the control fluid pressure upon the venting thereof to effect a proportional reduction of the applied fluid pressure;
 a flow passage in the housing for the flow therethrough of the control fluid pressure upon the subjection thereof to the relay means;
 exhaust passage means in the housing corresponding to the flow passage for exhausting the control fluid pressure prior to energizing the solenoid valve;
 a valve seat in the housing about the flow passage;
 valve means for engagement with the valve seat, the valve means being movable into engagement with the valve seat to close the flow passage and isolate the control fluid pressure acting on the relay means upon the energization of the solenoid valve;

other exhaust passage means in the housing for communication with the isolated control fluid pressure;

another valve seat in the housing about the other exhaust passage means, the solenoid valve including other valve means for engagement with the other valve seat, the other valve means movable toward a position disengaged from the other valve seat to vent the isolated control fluid pressure through the other exhaust passage means upon the energization of the solenoid valve to engage the first named valve means with the first named valve seat;

recess means in the housing constituting a portion of the flow passage, the exhaust passage, and the other exhaust passage; and a chamber connected with the recess means.

2. A control valve according to claim 1 wherein:

the solenoid valve includes a pole piece having opposed portions disposed within the recess means and the chamber;

a portion of the other exhaust passage means formed in the pole piece between the recess means and chamber;

coil means in the chamber about at least a portion of the pole piece;

armature means movable in the coil means for magnetic holding engagement with the pole piece upon energization of the coil means for actuation of the first named and other valve means;

the solenoid valve further comprises valve stem means movable in the other exhaust passage means and having opposite ends, one of the opposite ends being disposed in the recess means and carrying the first named and other valve means, the other of the opposite ends being disposed in the chamber for driven engagement with the armature means upon movement thereof.

3. A control valve according to claim 2 wherein:

the first named valve seat is disposed on a wall of the recess means about the flow passage; and the other valve seat is disposed on the pole piece within the recess means and about the other exhaust passage means.

4. A control valve according to claim 1 wherein:

another solenoid valve in the housing is operable to open further exhaust passage means for exhausting the isolated control fluid pressure to supplement exhausting of the control fluid pressure through the other exhaust passage means.

* * * * *

UNITED STATES PATENT OFFICE
CERTIFICATE OF CORRECTION

Patent No. 3,881,779        Dated May 6, 1975

Inventor(s) John A. Machek

It is certified that error appears in the above-identified patent and that said Letters Patent are hereby corrected as shown below:

Column 3, line 35, "522" should be -- 52a --; line 35, "abuting" should be -- abutting --. Column 10, line 33, "indicated" should be -- indicating --; line 66, "u" should be -- U --.

Signed and Sealed this fourteenth Day of October 1975

[SEAL]

Attest:

RUTH C. MASON
Attesting Officer

C. MARSHALL DANN
Commissioner of Patents and Trademarks